United States Patent [19]

Ito

[11] Patent Number: 5,130,964
[45] Date of Patent: Jul. 14, 1992

[54] TRACK SEEKING CONTROL APPARATUS FOR USE IN DATA RECORDING/REPRODUCTION SYSTEMS HAVING DATA TRACKS THEREON

[75] Inventor: Kenichi Ito, Hachioji, Japan

[73] Assignee: Olympus Optical Co., Ltd., Tokyo, Japan

[21] Appl. No.: 485,972

[22] Filed: Feb. 27, 1990

[30] Foreign Application Priority Data

Mar. 2, 1989 [JP] Japan .................................. 1-50661

[51] Int. Cl.$^5$ .......................... G11B 21/10; G11B 7/00
[52] U.S. Cl. .................................. 369/44.28; 369/32; 360/78.05; 360/77.07
[58] Field of Search ...................... 369/32, 44.28, 44.34, 369/44.25, 47, 48; 360/78.04, 78.05, 77.02, 77.07

[56] References Cited

U.S. PATENT DOCUMENTS

| | | | |
|---|---|---|---|
| 4,125,882 | 11/1978 | Erickson, Sr. et al. | 360/78.04 |
| 4,761,775 | 8/1988 | Murakami | 369/32 |
| 4,811,316 | 3/1989 | Hosoya | 369/32 |
| 4,866,686 | 9/1989 | Verboom | 369/32 |
| 4,901,298 | 2/1990 | Masaki | 360/78.04 |
| 5,001,732 | 3/1991 | Nomura et al. | 369/32 |
| 5,020,044 | 5/1991 | Shimonou | 369/44.28 |

FOREIGN PATENT DOCUMENTS

59-221878 12/1984 Japan .

*Primary Examiner*—Donald McElheny, Jr.
*Assistant Examiner*—Khoi Truong
*Attorney, Agent, or Firm*—Frishauf, Holtz, Goodman & Woodward

[57] ABSTRACT

A track seeking control apparatus includes an optical head for generating a signal comprising a train of track cross pulses when it crosses tracks on a recording medium. A first counter counts the train of track cross pulses generated by the optical head, and produces a signal representative of a count value of the first counter. A signal generator generates a signal of a frequency varying proportional to a frequency of the track cross pulse signal. A second counter counts the train of track cross pulses generated by the optical head, based on the output signal of the signal generator, and produces an output signal when a count by the second counter reaches a desired value. A second pulse generator outputs to the first counter a correcting pulse for correcting the count value of the first counter, in response to the output signal produced by the second counter.

8 Claims, 5 Drawing Sheets

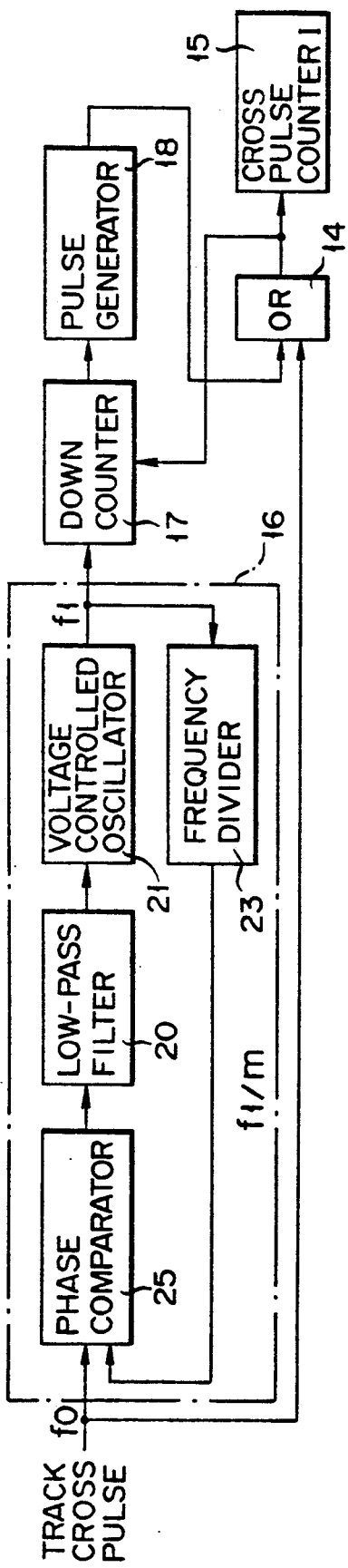
F I G. 7
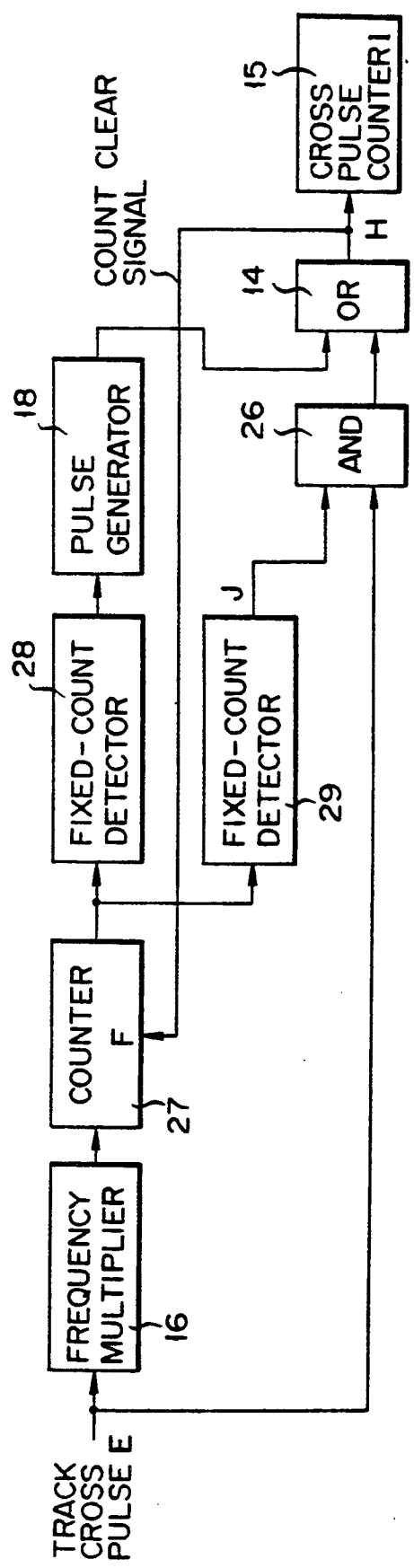
F I G. 8

TRACK SEEKING CONTROL APPARATUS FOR USE IN DATA RECORDING/REPRODUCTION SYSTEMS HAVING DATA TRACKS THEREON

BACKGROUND OF THE INVENTION

1. Field of the Invention

The present invention relates to a track seeking control apparatus in use with a data record/reproduction system which has at least one of the functions to record and reproduce data to and from a recording medium with tracks, and to erase data as stored in the recording medium.

2. Description of the Related Art

Recently, data record/reproduction systems of the type in which data is recorded in high density into a recording medium by a laser beam, and is reproduced from the same, have come in. A typical example of those systems is an optical disk system. An interval between the adjacent tracks on an optical disk is usually 1.6 $\mu$m. This figure indicates that the optical disk is capable of recording data in much higher recording density than other types of memories. The optical disk system, however, requires an extremely fine control technique to exactly position an optical head at a desired track on the optical disk, when compared with another type of disk memory.

A known seeking control system for positioning the optical head at a desired or target track on the optical disk, counts track cross signals generated when the head crosses the tracks, and seeks a target track on the basis of the count Another known seeking control system moves the optical head toward a target track with reference to an external scale. The former may more exactly position the head than the latter. The tracks on the optical disk are generally divided into a plurality of data areas (referred to as sectors). The head of each sector contains a portion where a track or a groove terminates. This portion of the sector is used for prestoring a track number or a sector number, or as a mirror portion (or a mirror mark) to remove a track offset, which is essential to the push-pull tracking system. To seek a target track on the optical disk thus arranged, the optical head is moved while counting track cross signals. When a light spot emitted by the head passes the groove portion during the seek operation, the head may fail to detect and count a track cross signal. Therefore, the counting of the track cross signal is incorrect.

To solve such a problem, Japanese Patent Application Unexamined Publication No. 59-221878 proposed the seeking control system. A circuit arrangement implementing the seeking control system is shown in FIG. 1. A track cross pulse as read by an optical head (not shown) is detected through a combination of a NOT circuit 1, flip-flops 2 and 3, and an AND gate 4. The cross pulse signal is applied through an OR gate 5 to a cross pulse counter 6, and is counted by the counter 6. An inter-pulse counter 8 counts a value of an interval between the adjacent cross pulses with reference to reference pulses generated by a reference pulse generator 7. The pulse interval value is applied through an AND gate 9 to a count memory 11. A divider 10 divides the pulse interval value as inputted from the inter-pulse counter 8 by the previous pulse interval value as stored in the count memory 11. If the track cross pulses are normally counted, the pulse interval values are equal and hence an output signal of the divider 10 represents 1. Under this condition an output signal of a −1 circuit 12, which subtracts 1 from the output signal of the divider 10, represents 0. Therefore, a pulse generator 13 produces no pulse. When one pulse is missed out of the train of the cross pulses, a value of the output signal of the inter-pulse counter is two times the output signal value when all of the cross pulses are counted. Accordingly, an output signal of the divider 10 represents 2. Under this condition, an output signal of the −1 circuit 12 is 1, and the pulse generator 13 produces one shot of pulse. This pulse is applied through the OR gate 5 to the cross pulse counter 6. In this case, the pulse applied substitutes itself for the pulse missed from the cross pulse train. A sequence of the above operations may be charted as shown in FIG. 2. As seen, when the pulse subsequent to an (N+1) pulse of the cross pulse signal is missed, a count C of the inter-pulse counter 8 is 2 m, not the normal value "m". Since a count of the counter, when it counts an interval between the pulses N and N+1, is "m". The output signal of the divider 10 represents 2. The output signal of the −1 circuit 12 causes the pulse generator 13 to generate a pulse denoted as D.

Actually, however, the intervals each between the adjacent pulses of a train of track cross pulses are exactly equal to one another. Therefore, when one pulse is missed out of the cross pulse train, the pulse interval between the adjacent pulses is not always two times or larger than the previous pulse interval. When the pulse interval is smaller than the previous pulse interval, the conventional seeking control system does not produce a substitution pulse. Accordingly, the count by the cross pulse counter is incorrect. Where the optical head crossing the tracks is movable in a broad range of speeds, to obtain at a satisfactory resolution the pulse intervals of the cross pulses detected when the optical head is moved at a high speed, it is required that the frequency of the reference pulse must be set to be extremely high. If the pulse intervals obtained when the head is moved at a low speed is counted on the basis of the high frequency reference pulse, the count progresses at an excessively high frequency and therefore, some measure to prevent occurrence of overflow must be applied to the inter-pulse counter, count memory, divider and the like. That is, those components must be of the large-bit type. Use of such components leads to increase of cost to manufacture. Particularly, the divider per se is an expensive component. The increase of the cost becomes more marked.

SUMMARY OF THE INVENTION

Accordingly, an object of the present invention is to provide a track seeking control apparatus which is low in cost and is able to exactly control the seeking operation.

To achieve the above object, there is provided a track seeking control apparatus comprising first pulse, generating means for generating a signal comprising a train of track cross pulses when the first pulse generating means crosses tracks on a recording medium, first count means for counting the train of track cross pulses generated by the first pulse generating means, and producing a signal representative of a count value of the first count means, signal generating means for generating an output signal of a frequency varying proportional to a frequency of the track cross pulse signal generated by the first pulse generating means, second count means for counting the train of track cross pulses generated by the first pulse generating means, based on the output signal of the signal generating means, and when a count by the second count means reaches a desired value, producing an output signal, and second pulse generating means for outputting to the first count means a correcting pulse for correcting the count value of the first count means, in response to the output signal produced by the second count means.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a block diagram showing yet another example of the frequency multiplier used in the track seeking control apparatus of FIG. 3;

FIG. 8 is a block diagram showing a track seeking control apparatus according to another embodiment of the present invention.

DETAILED DESCRIPTION OF THE PREFERRED EMBODIMENTS

Some specific embodiments of the present invention will be described with reference to the accompanying drawings.

Figure 1:
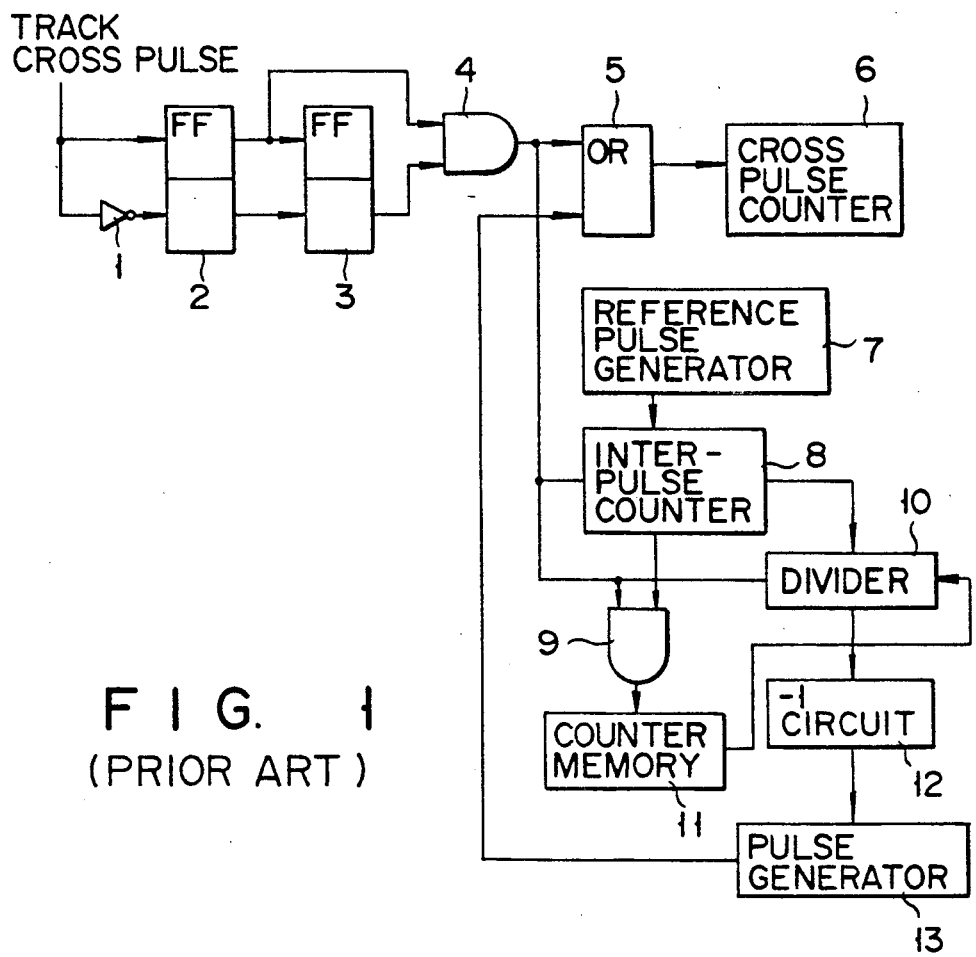
FIG. 1 is a block diagram showing a conventional track seeking control apparatus.
Figure 2:
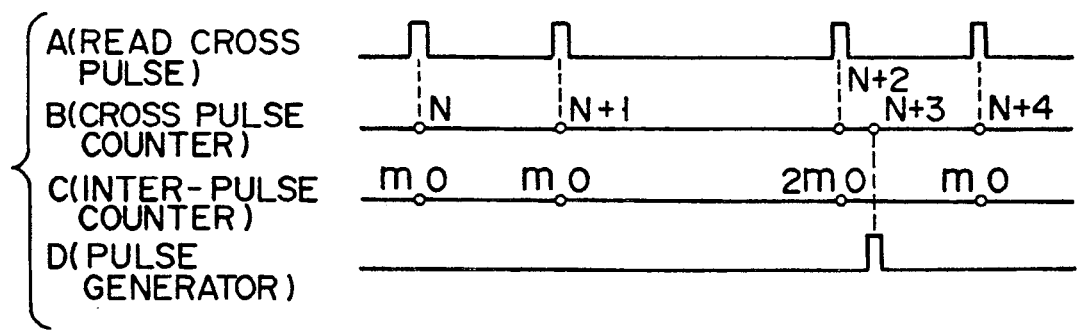
FIG. 2 is a timing chart useful in explaining an operation of the track seeking control apparatus of FIG. 1.
Figure 3:
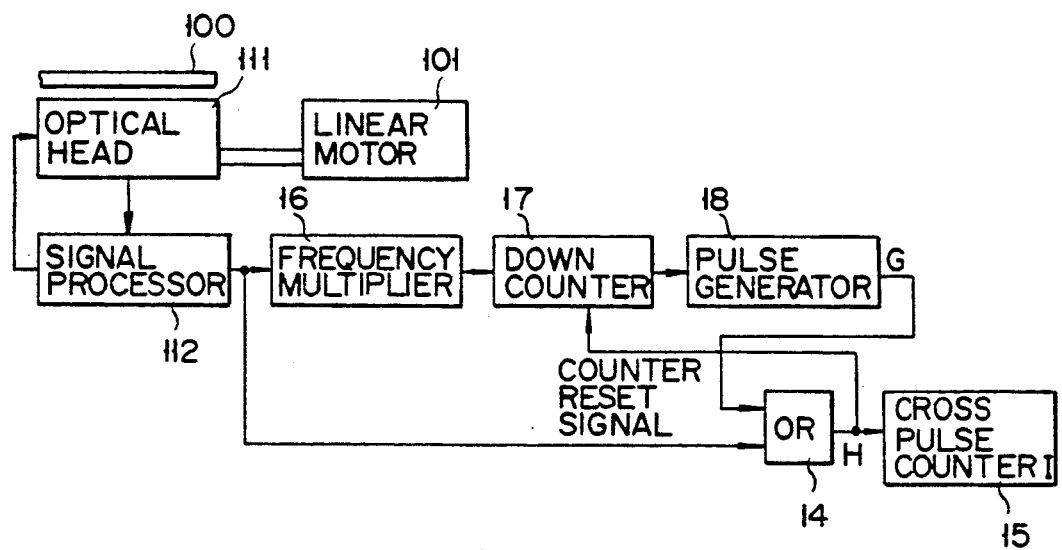
FIG. 3 is a block diagram showing a track seeking control apparatus according to an embodiment of the present invention.

FIG. 3 is a block diagram showing a track seeking control apparatus according to an embodiment of the present invention.

An optical head 111 is constituted such that it can detect a track error signal obtained from the light reflected at an optical disk 100 using the push-pull method. The track error signal is fed back to a tracking actuator (not shown) of the voice coil structure for actuating an object lens to perform tracking servo control.

To seek a desired track on the optical disk 100, the optical head 111 is moved toward the desired track. During the seeking operation, which is made possible by the actuation of a linear motor for moving the tracking actuator and/or the head, track error signals are successively read from the disk 100 by the head 111. The error signals are applied to a signal processor 112 where those are transformed into a pulse signal as a track cross pulse comprising a train of pulses. The pulse signal is applied through an OR gate 14 to a cross pulse counter 15. Then, the counter 15 counts the number of tracks the optical head 111 has crossed. During the seeking operation the tracking servo loop is made open by opening the switch in the loop. An example of the track seeking apparatus is described in U.S. Pat. No. 4,481,613. The cross pulse signal is also applied to a frequency multiplier 16. This circuit 16 produces a signal whose frequency is "m" times a frequency of the cross pulse signal applied thereto. A down-counter 17 receives the output signal of the frequency multiplier 17, and counts down the same signal from a preset value "n". The value "n" corresponds to an average value of occurring intervals of track cross pulses. When the counting by the counter 17 progresses and the count becomes 0, the counter 17 produces a signal. In response to the output signal of the down-counter 17, a pulse generator 18 produces pulses one by one. The pulse generator may be an ordinary monostable multivibrator IC commercially available. The pulse signal outputted from the pulse generator 18 is applied through an OR gate 14 to the cross pulse counter 15. The output signal of the OR gate 14 is used for counting the track cross pulses by the counter 15. The output signal of the OR gate 14, viz., comprising the track cross pulses to be counted, is also applied to the down-counter 17. In this case, the output signal serves as a counter reset signal to set the counter 17 at "n".

Figure 4:
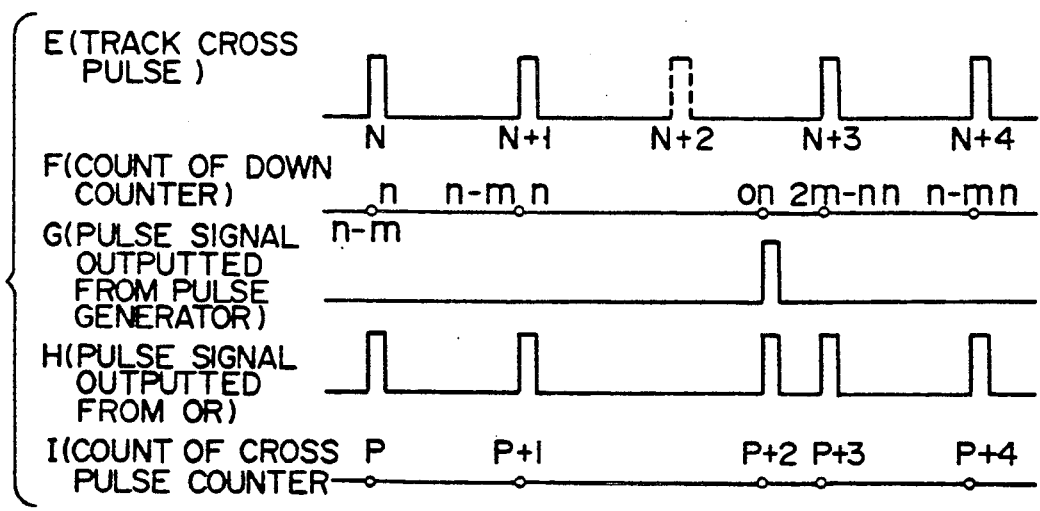
FIG. 4 is a timing chart useful in explaining an operation of the track seeking control apparatus of FIG. 3.

An operation of the track seeking control apparatus thus arranged will be described with reference to FIG. 4 showing a timing chart.

A pulse signal E comprising a train of track cross pulses N, N+1, N+3, and N+4, that is derived from the head 111, goes through the OR gate 14 to the cross pulse counter 15. The counter 15 counts those track cross pulses. The counts by the counter are illustrated P, P+1, P+3, and P+4 (see (I) in FIG. 4). A frequency of the track cross pulse signal applied to the frequency multiplier 16 is multiplied by "m". The cross pulse signal of the frequency thus multiplied is counted down "m" times by the down-counter 17. When it is counted down "m" times, the count of the counter is "n−m". At this time, the next track cross pulse is usually applied to the OR gate 14. Accordingly, the down-counter 17 is set at "n" (see (F) in FIG. 4) by a counter set signal shown as (H) OR gate output in FIG. 4.

A pulse N+2 as indicated by a broken line (see (E) in FIG. 4) indicates a pulse that was missed and not detected. After the counter 15 counts the pulse N+1 and its count becomes P+1, the down-counter 17 continues the counting operation even after its count exceeds "n−m", because the pulse N+2 is missed and hence the OR gate produces no output signal. When the count of the down-counter 17 reaches 0, the down-counter 17 produces a signal, and the pulse generator 18 produces one shot of pulse (see (G) in FIG. 4). In turn, the OR gate 14 produces a signal. In response to the output signal H of the OR gate, the cross pulse counter 15 counts the missed pulse N+2 and its count becomes P+2 ((I) in FIG. 4). The output signal H of the OR gate 14, which is applied to the down-counter 17 to cause it to count the P+2, also sets the counter 17 at "n". Then, the track cross pulse N+3 is applied through the OR gate 14 to the cross pulse counter 15. The counter 15 counts it and its count becomes P+3. The down-counter 17 is set at "n".

Figure 5:
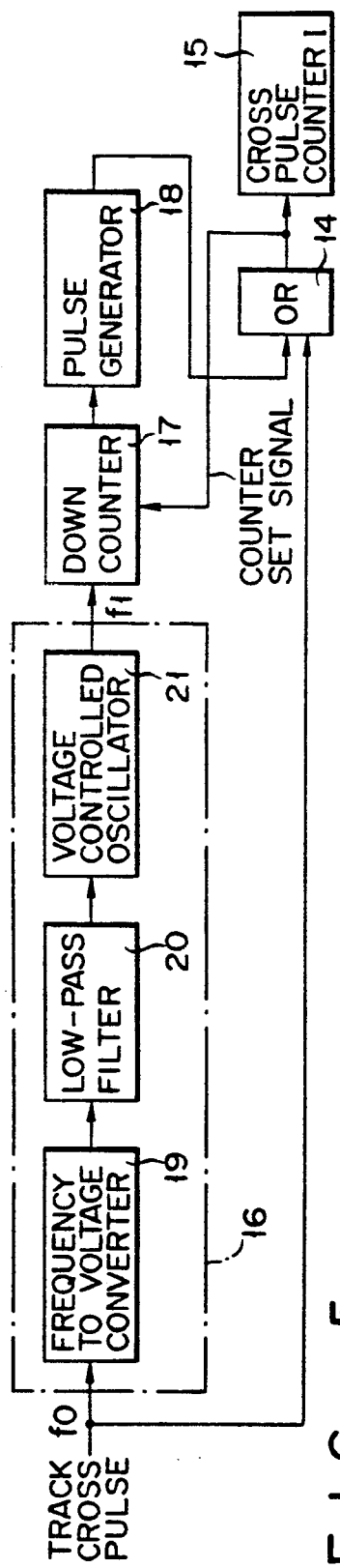
FIG. 5 is a block diagram showing an example of the frequency multiplier used in the track seeking control apparatus of FIG. 3.

FIG. 5 is a block diagram showing the details of an example of the frequency multiplier 16 used in the track seeking control apparatus of FIG. 3.

As shown, the frequency multiplier 16 is made up of a frequency-to-voltage converter 19, low-pass filter 20, and voltage controlled oscillator 21. When received a track cross pulse signal, the frequency-to-voltage converter 19 produces a voltage proportional to a frequency of the track cross pulse signal. The low-pass filter 20 allows only the low frequencies of the voltage signal to pass therethrough. The voltage signal derived from the low-pass filter 20 enters the voltage controlled oscillator 21. The oscillator 21 produces a signal whose frequency is proportional to the voltage signal applied thereto. The frequency of the output signal of the frequency multiplier 16, more exactly the output signal of the voltage controlled oscillator 21 may be j"m" times the frequency of the cross pulse signal applied to the frequency multiplier, if the proportional constant is so selected. When the track cross pulse is inputted to the frequency-to-voltage converter 19, and the high frequencies of the voltage signal derived from the converter 19 are removed by the low-pass filter 20, the voltage signal outputted from the low-pass filter is proportional to the frequency of the track cross pulse and is little influenced by the missing of pulse. Assuming that the frequency of the output signal of the voltage controlled oscillator 21 is f1, and the frequency of the frequency-to-voltage converter 19 is f0, then we have $$f1 = m \times fo$$

where m = proportional constant. In this instance, the related parts are selected so that "m" is 2 or larger.

In the first embodiment as mentioned above, the pulse intervals of the track cross pulses are counted in accordance with the signal based on the frequency of the track cross pulse. Accordingly, even if the moving seed of the optical head varies, the tracks that the head crosses can be detected constantly at fixed pulse intervals. Therefore, the track seeking control apparatus of the first embodiment can position exactly the optical head at a desired track, with a low cost of manufacturing and a broad range of seeking speed of the head.

Figure 6:
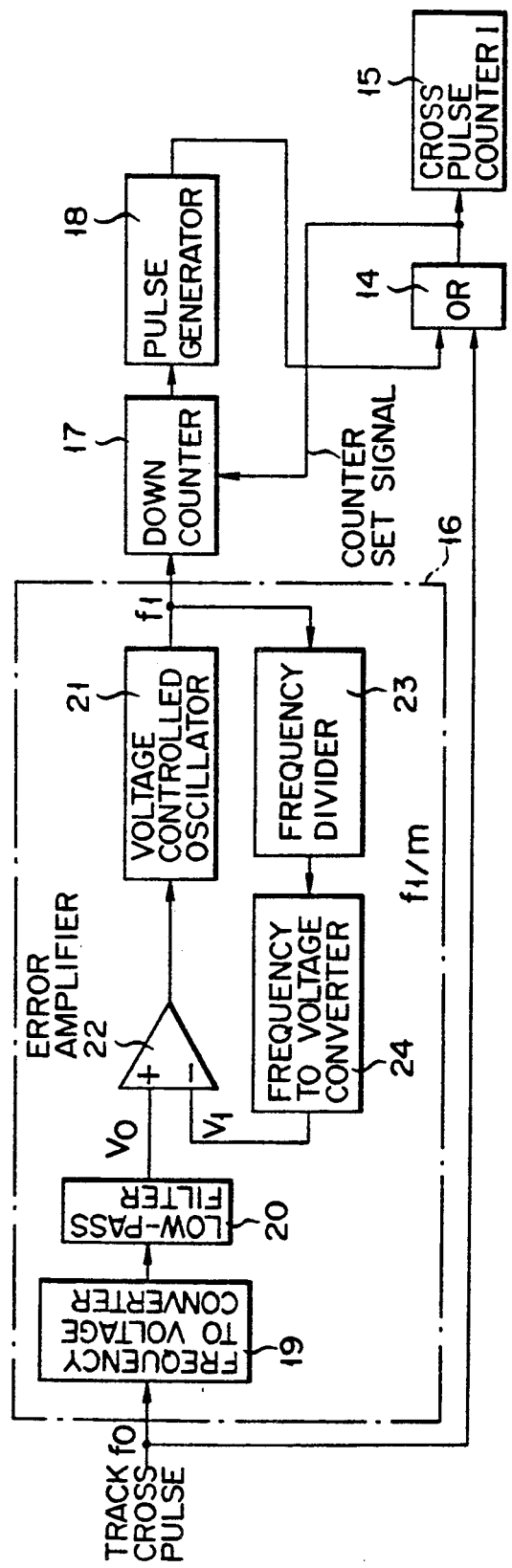
FIG. 6 is a block diagram showing another example of the frequency multiplier used in the track seeking control apparatus of FIG. 3.

FIG. 6 is a block diagram showing another example of the frequency multiplier used in the track seeking control apparatus of FIG. 3.

As shown, the frequency multiplier 16 like that of FIG. 5 includes a frequency-to-voltage converter 19 and a low-pass filter 20. The output signal of the low-pass filter 20 is applied to the non-inverting input terminal of an error amplifier 22. The output signal of the amplifier 22 is applied to a voltage controlled oscillator 21. The output signal of the voltage controlled oscillator 21 is applied to a down-counter 17 and to a frequency divider 23. The output signal of the frequency divider 23 is applied to a frequency-to-voltage converter 24 whose output signal is applied to an inverting input terminal of the error amplifier 22. Thus, the frequency divider 23 and the frequency-to-voltage converter 24 form a feedback line for feeding the output signal of the voltage controlled oscillator 21 back to the inverting input terminal of the error amplifier 22. The output signal of the low-pass filter 20 is a voltage Vo that is proportional to the frequency fo of the track cross pulse and is little influenced by the missing of pulse. The frequency divider 23 divides the frequency f1 of the output signal of the voltage controlled oscillator 21 into a factor of "m" (1/m). Receiving the output signal of the frequency divider 23, the frequency-to-voltage converter 24 produces a voltage V1 in proportion to the frequency f1/m. A difference between the voltages V0 and V1 is amplified by the error amplifier 22, and is applied to the voltage controlled oscillator 21. The feedback loop functions to zero the difference (V0−V1). In other words, the voltage controlled oscillator 21 is controlled so as to satisfy the relation f1 = m×f0. If the two frequency-to-voltage converters used have the same characteristics, the relation f1 = m×fo can be correctly kept and an accuracy of the count of the cross pulse counter is improved, even if the voltage controlled oscillator whose linearity and temperature characteristic are poor is used. This is because the effects of those characteristics are cancelled out.

FIG. 7 is a block diagram showing yet another example of the frequency multiplier used in the track seeking control apparatus of FIG. 3.

The frequency multiplier 16 is made up of a phase comparator 25, low-pass filter 20, voltage controlled oscillator 21, and a frequency divider 23. A track cross pulse signal detected by an optical head is inputted to the low-pass filter 20 through a phase comparator 25. The output signal of the low-pass filter 20 is applied to the voltage controlled oscillator 21. The output signal of the oscillator 21 is a signal of frequency f1 which must be theoretically expressed as f1 = m×f0. The frequency divider 23 divides the frequency f1 of the output signal into a frequency f1/m. The output signal of the frequency divider 23 is then applied to the phase comparator 25. The comparator 25 compares the cross pulse signal of the frequency fo with the signal of the frequency f1/m. In response to the result of the phase comparison, the phase comparator 25 outputs a corresponding signal for controlling an oscillating frequency of the voltage controlled oscillator 21 to remove a phase difference. More exactly, the closed loop controls the oscillating frequency f1 of the voltage controlled oscillator 21 so as to keep the relation f1 = m×fo where fo = frequency of the track cross pulse signal. It is noted that the frequency multiplier in this instance uses the single phase comparator in place of the two frequency-to-voltage converters in the second instance of the frequency multiplier. Therefore, a required number of parts used is reduced in this instance. Because of the integration characteristic of the closed loop, which is due to the phase comparison, the phase comparator is little influenced by the temperature characteristic and offset.

FIG. 8 is a block diagram showing a track seeking control apparatus according to a second embodiment of the present invention.

In the second embodiment, like reference symbols are used for designating like or equivalent portions in the drawings of the first embodiment.

A track cross pulse signal derived from an optical head is applied through an AND gate 26 and an OR gate 14 to a cross pulse counter 15, and is counted by the counter 15.

The track cross pulse signal of frequency f0 is also applied to a frequency multiplier 16. The multiplier 16 produces a signal of the frequency f1, which is "m" times the input frequency f0. This output signal of frequency f1 is inputted to a counter 27. The counter 27 as an up-counter counts up an output signal of the frequency multiplier 16 from 0. The output signal of the counter 27 is a digital signal consisting of several bits, which represents a count of the counter. The output signal of the counter 27 is applied to fixed-count detectors 28 and 29. A digital value representing a desired count "n" is preset in the detector 28. When the output signal of the counter 27 is equal to the value "n" the detector 28 produces a signal of a predetermined time duration, and in turn the pulse generator 18 produces one shot of pulse. The one-shot pulse is applied through the OR gate 14 to the cross pulse counter 15 where it is counted. A digital value corresponding to a desired count "1" is preset in the fixed count detector 29. When the count of the counter 27 reaches the desired count "1", the output signal of the fixed count detector 29 goes high, and the high logical state is continued until the counter 27 is cleared. During a period that the fixed count detector 29 is in the logical high state, the AND gate 26 permits the track cross pulse to pass therethrough. The signal to clear the counter 27 comes from the OR gate 14. That is, the counter 27 is cleared by using the pulse to be counted by the counter 15.

An operation of the track seeking control apparatus according to the second embodiment thus arranged will be described with reference to FIG. 9.

Figure 9:
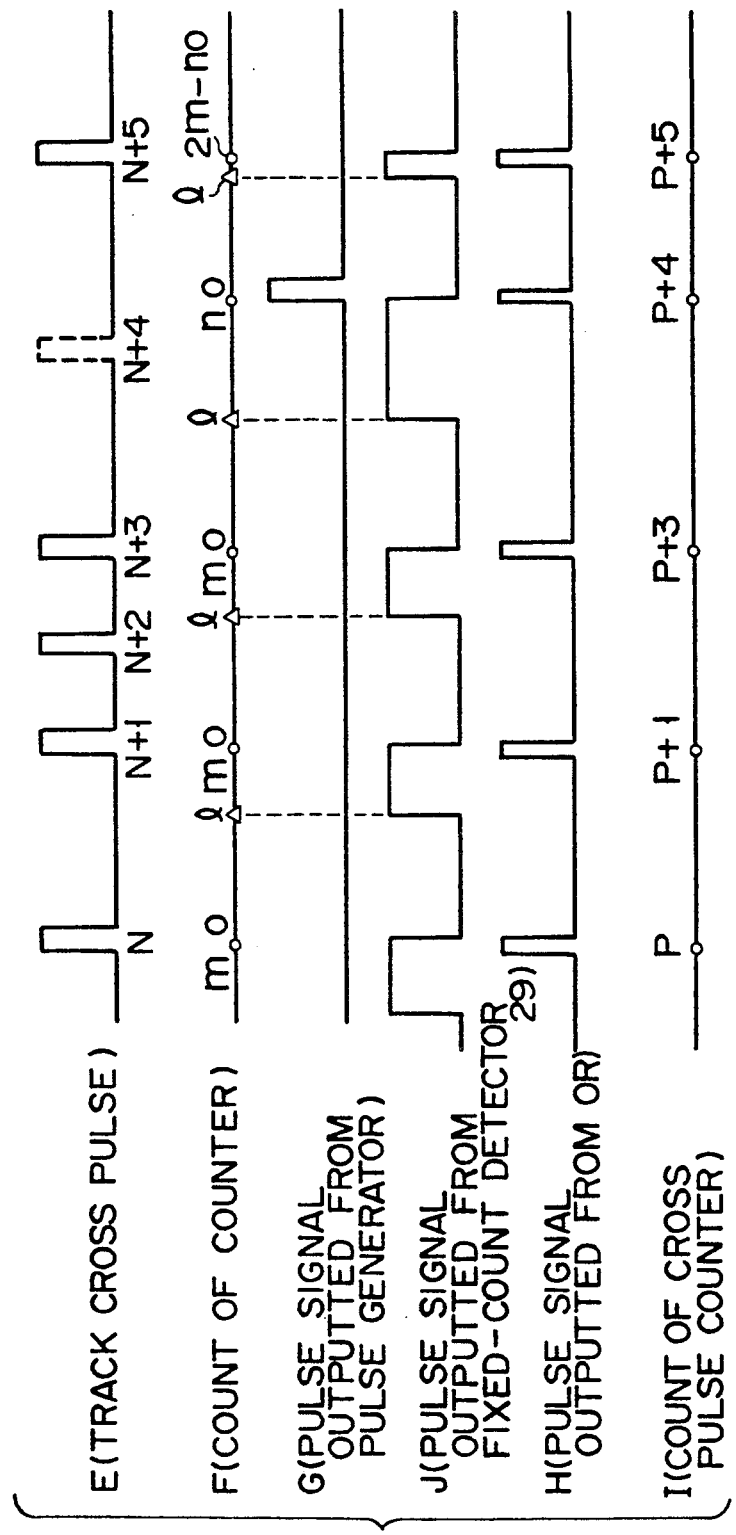
FIG. 9 is a timing chart useful in explaining an operation of the track seeking control apparatus of FIG. 9.

In this instance, a track cross pulse signal E consists of a train of pulses N, N+1, N+2, N+3, and N+5, as shown in FIG. 9. The cross pulse signal is applied to the frequency multiplier 16. The multiplier multiplies the frequency of the track cross pulse signal by "m". The counter 27 receives the track cross pulse N, and responsive to it, the counter 27 is counted up. When a count F of the counter 27 reaches the count "1", the output signal J of the fixed count detector 29 goes high, and enables the AND gate 26, so that it allows the track cross pulse to pass therethrough. Normally, at the instant that the count F of the counter 29 becomes "m", the next pulse N+1 arrives. Under this condition, the AND gate 26 allows the cross pulse N+1 to pass therethrough. The OR gate 14 produces a pulse of the pulse signal H. Also at this time, the count of the cross counter 15 becomes P+1 as indicated by the count of the cross pulse counter 15 (see (I) in FIG. 9). The output signal H of the OR gate 14 is applied as a counter clear signal to the counter 27, to clear the count of the counter 27 to 0. At this time, the fixed count detector 29 also goes low. Under this condition, the AND gate 26 is disabled, to prohibit the track cross pulse from passing therethrough. The counter 27 is counted up again from 0. it is assumed that an abnormal pulse N+2 appears in the track cross pulse signal. At this time, the counter of the counter 27 does not yet reach the count "1". The output signal of the fixed count detector 29 remain low in logical state. Accordingly, the track cross pulse N+2 is inhibited from passing through the OR gate 26, and it is not counted by the cross pulse counter 15. The counting by the counter 27 further progresses and its count reaches the count "1". At this time, the fixed count detector 29 produces a logical high signal, to enable the AND gate 26 allowing the track cross pulse to pass therethrough. When the count F of the counter 27 reaches the value "m", if the next pulse N+3 arrives, it is applied through the AND gate 26 and the OR gate 14 to the cross pulse counter 15. The counter 15 counts it and its count becomes P+3 as indicated the (I) in FIG. 9. The output signal of the OR gate 14 is applied to the counter 27 to clear it. The output signal of the fixed count detector 29 also goes low.

The counter 27 starts to count up from 0 again. When the count F of the counter 27 reaches the count "1", the output signal J of the fixed count detector 29 goes high, to enable the AND gate 26 to allow the track cross pulse to pass therethrough. It is assumed now that a track cross pulse of N+4 is missed, which in a normal state it would appear at this time point. At the instant that the count F of the counter 27 reaches the value "n", the fixed count detector 28 produces a signal of a predetermined time duration, which in turn causes the pulse generator 18 to generate one shot of pulse. This pulse is applied through the OR gate 14 to the track cross pulse counter 15, and the counter 15 counts it and its count becomes P+4. The output signal of the OR gate 14 clears the counter 27 and an output signal of the fixed count detector 29 goes low.

The values "1" and "n" set in the fixed count detectors 28 and 29, and the multiple "m" of the frequency multiplier 16 are related as $1 < m < n$.

To generate a correction pulse, the intervals between the adjacent track cross pulses are counted "n" times, the counter is cleared, and the pulse intervals are further counted "1" times. A state ready for counting of the track cross pulses is set up. At this time, if the next normal pulse has passed, it is impossible to exactly detect the track cross pulse. To avoid this, those values 1, m, and n are related as $n - m < m - 1$.

As seen from the foregoing description, the number of track cross pulses that are generated when the optical head passes the tracks can be exactly counted not only when a track cross pulse is missed but also when a false pulse is generated.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

What is claimed is:

1. A track seeking control apparatus comprising:
   first pulse generating means for generating a signal comprising a train of track cross pulses when said first pulse generating means crosses tracks on a recording medium;
   first count means for counting the train of track cross pulses generated by said first pulse generating means, and producing a signal representative of a count value of said first count means;
   signal generating means for generating an output signal of a frequency varying proportional to a frequency of said track cross pulse signal generated by said first pulse generating means;
   second count means for counting the train of track cross pulses generated by said first pulse generating means, based on the output signal of said signal generating means, and when a count by said second count means reaches a desired value, producing an output signal; and
   second pulse generating means for outputting to said first count means a correcting pulse for correcting the count value of said first count means, in response to the output signal produced by said second count means.

2. The track seeking control apparatus according to claim 1, in which said first pulse generating means includes an optical head for receiving a light beam from said recording medium to produce a given track error signal, and means for transforming said track error signal into a track cross pulse signal comprising a train of pulses.

3. The track seeking control apparatus according to claim 1, in which said signal generating means includes a frequency multiplier for generating a signal of a frequency which is a multiple of the frequency of said track cross pulse signal.

4. The track seeking control apparatus according to claim 3, in which said frequency multiplier multiplies the frequency of said track cross pulse signal applied thereto at least two times.

5. The track seeking control apparatus according to claim 1, in which said first counter means includes an OR gate for outputting one of said track cross pulse signal generated by said first pulse generating means and said correcting pulse outputted from said second pulse generating means.

6. The track seeking control apparatus according to claim 5, further comprising feedback means for feeding the output signal of said OR gate back to said second count means, said second count means counting the output signal of said signal generating means on the basis of a value set therein in response to the output signal fed through said feedback means from said OR gate.

7. The track seeking control apparatus according to claim 5, further comprising feedback means for feeding the output signal of said OR gate back to said second count means, said second count means including a down counter for subtracting the the output signal of said signal generating means from a value set therein in response to the output signal fed through said feedback means from said OR gate.

8. The track seeking control apparatus according to claim 3, in which said frequency multiplier includes a frequency-to-voltage converter for producing a voltage signal proportional to the frequency of said track cross pulse signal generated by said first pulse generating means, a low-pass filter for filtering off the high frequencies of said voltage signal from said converter, and a voltage controlled oscillator for generating a signal whose frequency is proportional to a voltage of low frequencies outputted from said low-pass filter.

* * * * *